United States Patent [19]

Brooks et al.

[11] 3,764,994

[45] Oct. 9, 1973

[54] SERIAL PRINTER WITH BI-DIRECTIONAL DRIVE CONTROL

[75] Inventors: Everett G. Brooks; David O. Lewis, both of Rochester, Minn.

[73] Assignee: International Business Machines Corporation, Armonk, N.Y.

[22] Filed: Oct. 18, 1971

[21] Appl. No.: 189,865

[52] U.S. Cl. .............................................. 340/172.5
[51] Int. Cl. ......................... G05b 1/01, G06k 15/10
[58] Field of Search .................... 340/172.5; 101/93; 197/90, 82, 1 R

[56] References Cited

UNITED STATES PATENTS

| | | | |
|---|---|---|---|
| 2,701,632 | 2/1955 | Zint | 197/90 UX |
| 2,809,737 | 10/1957 | Zint | 197/90 X |
| 2,997,152 | 8/1961 | Dirks | 197/1 R |
| 3,517,592 | 6/1970 | Kollar | 197/1 R X |
| 3,670,861 | 6/1972 | Zenner | 197/1 R X |
| 3,496,547 | 2/1970 | Gorrill et al. | 340/172.5 |

*Primary Examiner*—Gareth D. Shaw
*Assistant Examiner*—Paul R. Woods
*Attorney*—Keith T. Bleuer et al.

[57] ABSTRACT

A serial printer having a print element capable of printing in both directions across a print form, means for pre-analyzing a succeeding line of print on the form following a preceding line of print to determine the end positions of the succeeding line of print, and means for causing the print element to move from the last position printed on the preceding line of print to the closer end position of the succeeding line of print so that printing of the succeeding line of print may take place beginning from said closer end print position of the succeeding line of print. One embodiment includes hardware for causing the printing element to so move to the closer end print position of the succeeding print line, and another embodiment utilizes a general purpose computer so programmed that this movement of the print element can take place. Means is also provided for causing the print element to move at a faster speed than printing speed if the print element traverses more than five spaces in reaching the closer end print position of the succeeding print line or if a print line includes more than five consecutive blank spaces.

18 Claims, 15 Drawing Figures

INVENTORS
EVERETT G. BROOKS
DAVID O. LEWIS
BY Keith T. Bleuer
ATTORNEY

PATENTED OCT 9 1973 3,764,994

SHEET 07 OF 10

SERIAL PRINTER WITH BI-DIRECTIONAL DRIVE CONTROL

BACKGROUND OF THE INVENTION

1. Field of the Invention

The invention relates to serial printers and, more particular, to controls for such printers. Still more particularly, the invention relates to controls for utilizing computer originated commands and data for controlling the operation of a serial printer.

Serial printers are printers of the type having either a lesser number of printing elements than is necessary to print across an eintire line or having a single print element. In the operation of a serial printer the print element moves over a certain distance along a line and is actuated for effecting printing at a plurality of locations during its travel. Serial printers, in general, either print one complete character at a time for each actuation of the print element, or they may print by composing a character by means of the actuation of a plurality of wires or other print elements printing less than an entire character, so that the characters are compositions of bars, dots, etc.

2. Description of the Prior Art

One type of printer in common usage is the so-called line printer in which an entire line of elements for a complete line of print are actuated at a time. Another type of printer is the serial printer in which successive characters in a line of print are printed serially across the sheet. Line printers have a relatively high print speed, but they suffer from the use of complex control circuits and they have a high cost of manufacture. For many applications, serial printers are therefore attractive since they are relatively inexpensive of manufacture and they require relatively simple controls.

Most of the serial printers print a line of characters by beginning from a left margin and sequentially printing until the line is complete. The sheet on which the printing is being accomplished is then indexed, and the printing element is then returned to the left margin before the subsequent line is printed on the sheet. This mode of operation is relatively ineffecient due to the time that is required to return the print element to the left margin, substantially reducing the speed of the printer. Therefore, the speed of printing by a serial printer can be substantially increased by indexing the sheet when a line of print is completed and then printing the next line backwards instead of returning the rpint element to the left margin.

Bidirectional printing in serial printers has been practiced prior hereto. Early embodiments of bidirectional printers require that the print head proceed from a preset left margin electric switch to a preset right margin electric switch before reversing and printing backwards from right to left. Later improvements provided the programmer of the data processing equipment associated with the serial printer the ability to specify a maximum line length for each program. With this arrangement, the serial print head had only to proceed from the left margin switch to the maximum right position specified by the program before reversing itself for printing from right to left. For programs requiring only short line lengths, which all start at the left margin, this technique significantly increased printer throughput.

SUMMARY OF THE INVENTION

It is an object of the present invention to provide an improved printer and controls therefor which increases the speed of operation of a printer, particularly one of the serial type, in comparison with a serial type printer which prints in both directions.

Typical business forms, such as payroll reports, trial balances, bills, inventory listings, etc., usually consist of lines of varying length and varying starting positions on the form. Also in typical business forms, there are often instances in which long gaps exist between characters in a particular print line. It is therefore another object of the invention to control both the direction and speed of a print head so as to minimize the travel time across individual lines of print and between sequential print lines.

More specifically, it is an object of the invention to achieve this minimum travel time without requiring modifications to programs previously written for execution by serial printers or either mono- or bi-directional capability.

A still more specific object of the invention is to provide printer controls for moving a bidirectional serial print head only the minimum distance required in passing from the completion of one print line to a commencement position in the next, with the direction of printing being selected for subsequent print lines so as to minimize head motion between the lines. Another object of the invention is to provide improved controls for a serial printer so as to cause the print head to move at an increased speed when the distance between the characters to be printed on a particular print line exceeds a predetermined distance.

It is still another object of the invention to provide such minimization of printer head motion in response to computer generated commands and assuming either mono- or bi-directional print capabilities of the equipment.

In a preferred form, a serial line printer according to the invention is used as the output media for computer generated data, and the associated computer originates certain control commands to the printer. These commands specify on a line basis where to find the data to be printed, when to start printing, and, in some instances, how many characters to print or when to stop printing. The invention utilizes a logical printer control technique requiring only that the operating program specify when the print and where the data to be printed is located. All unnecessary CPU (central processing unit) commands will be ignored. The printer control circuitry then causes those additional commands to be generated, required to minimize the print time for the specified line of print and for moving the print head from a completed line of print to the next subsequent line.

More particularly, the printer controls of the invention accomplish a preanalysis of an upcoming print line, a preanalysis of line 2, for example, at the completion of print line 1. According to this preanalysis, the circuitry makes a decision to space the paper on which the printing is accomplished and then begins printing the second line from the right to the left or from the left to the right, depending on which end of the second print line is closest to the position of the print head at the last character printed on the first line. Printing thus continues in this mode with the motion of the print head being minimized before printing each subsequent line.

The printer controls of the invention also moves the print head both forward and backward in a high speed mode if no characters are to be printed and if more than five spaces are left blank on any particular line to be printed, thus increasing the overall printing speed for any particular line.

Figure 2:
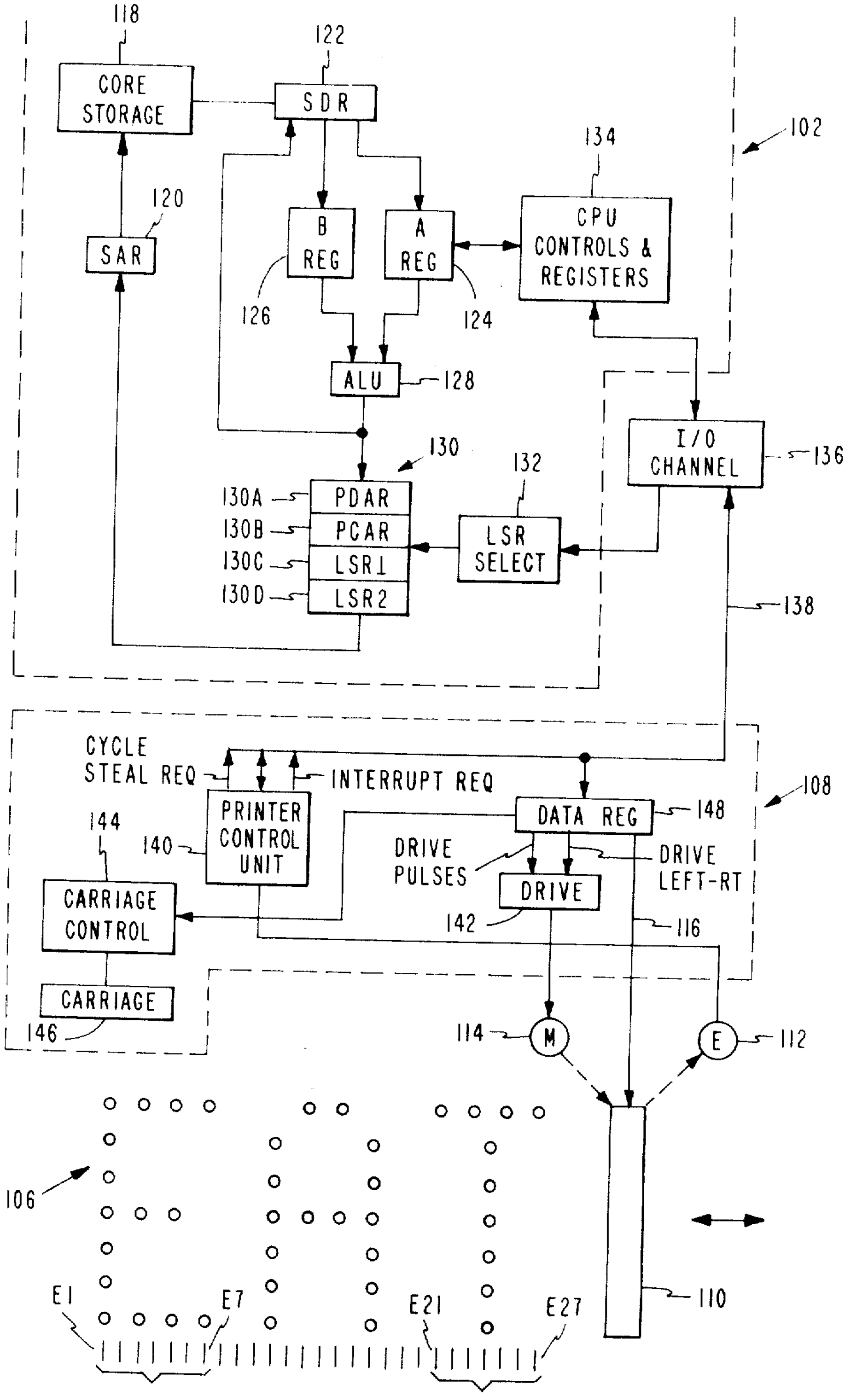
FIG. 2 is a diagramatic illustration of a wire matrix printer coupled to a CPU or central processing unit by means of a printer attachment.
Figure 3A:
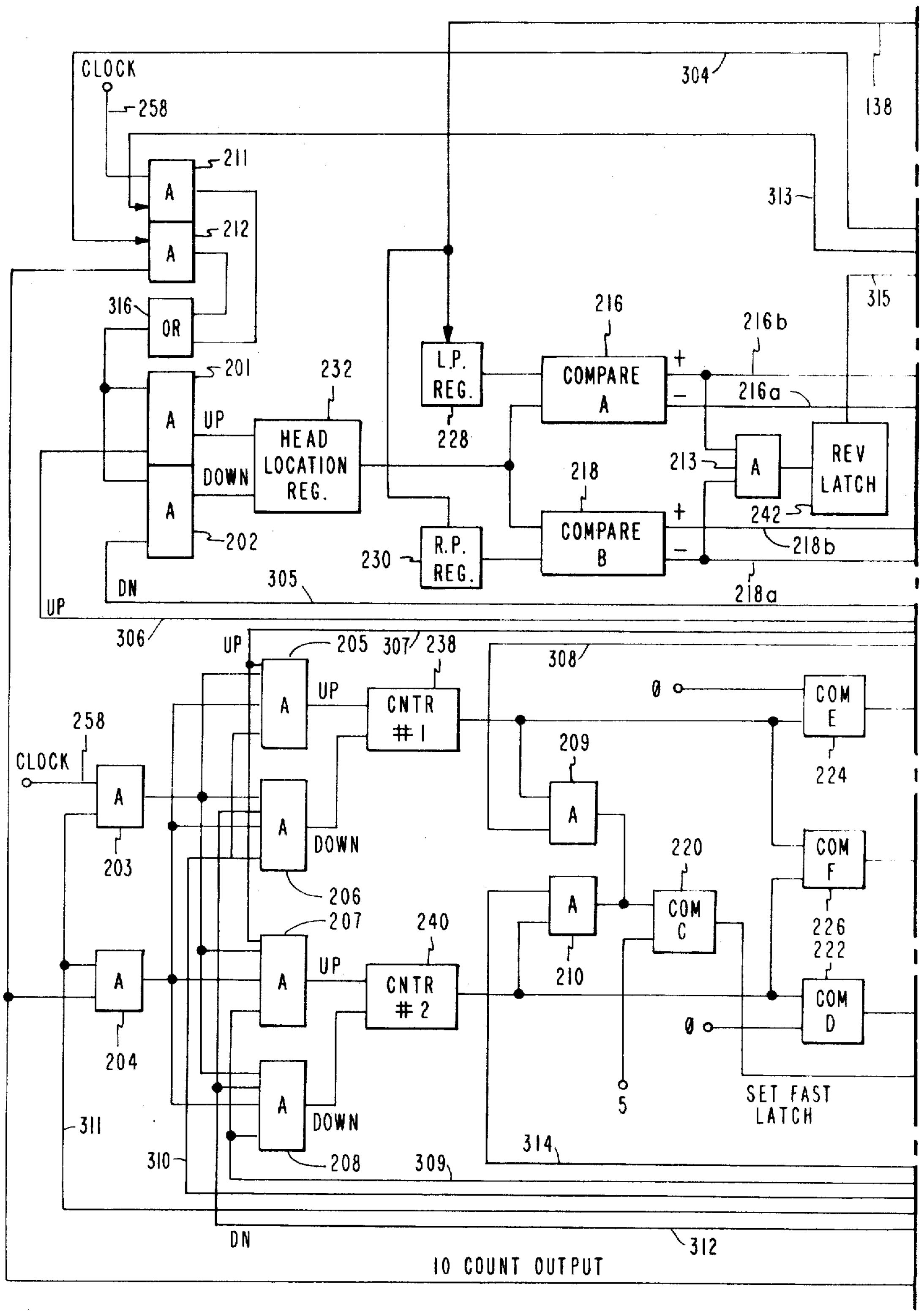
Figure 3B:
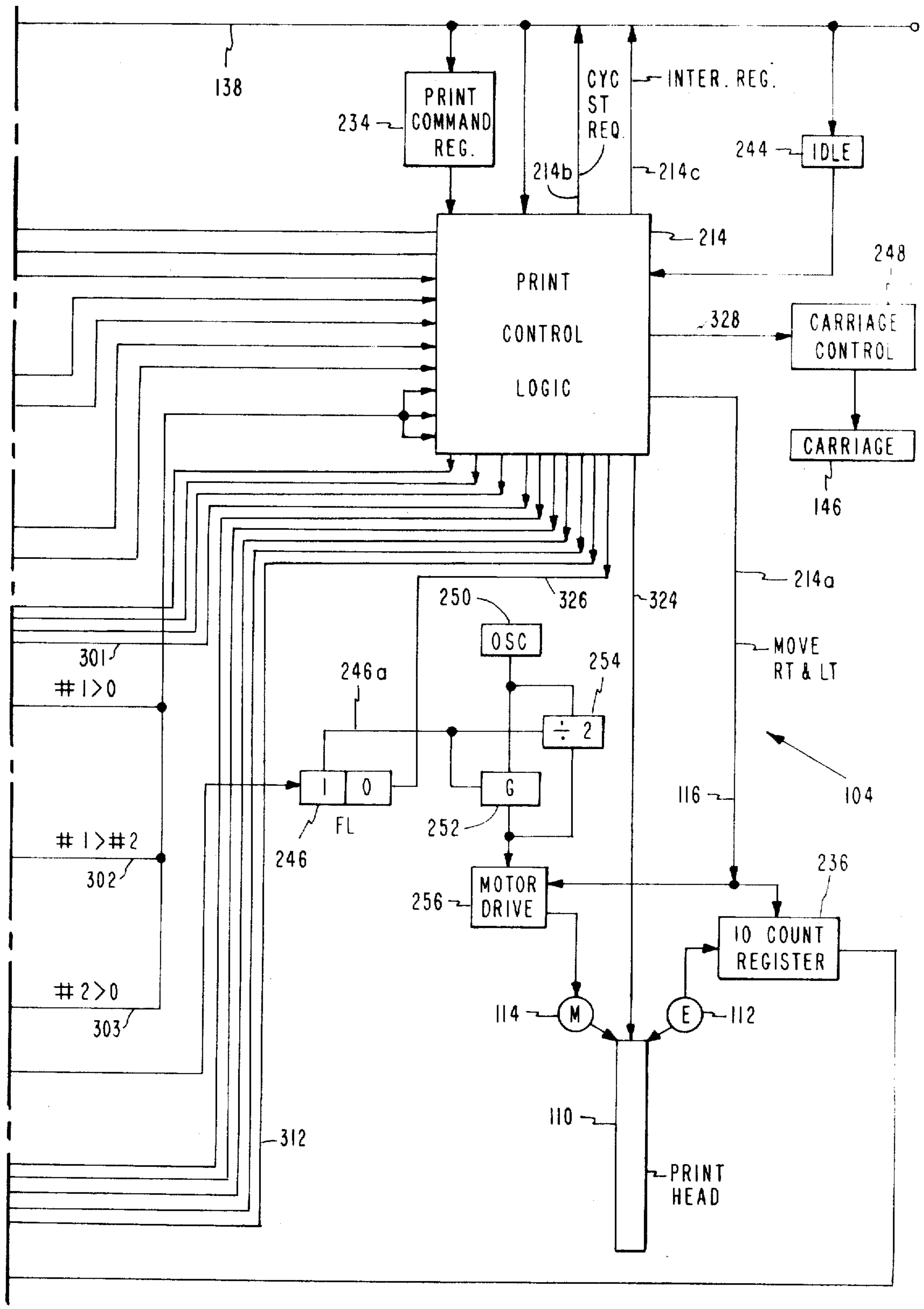
Figure 5A:
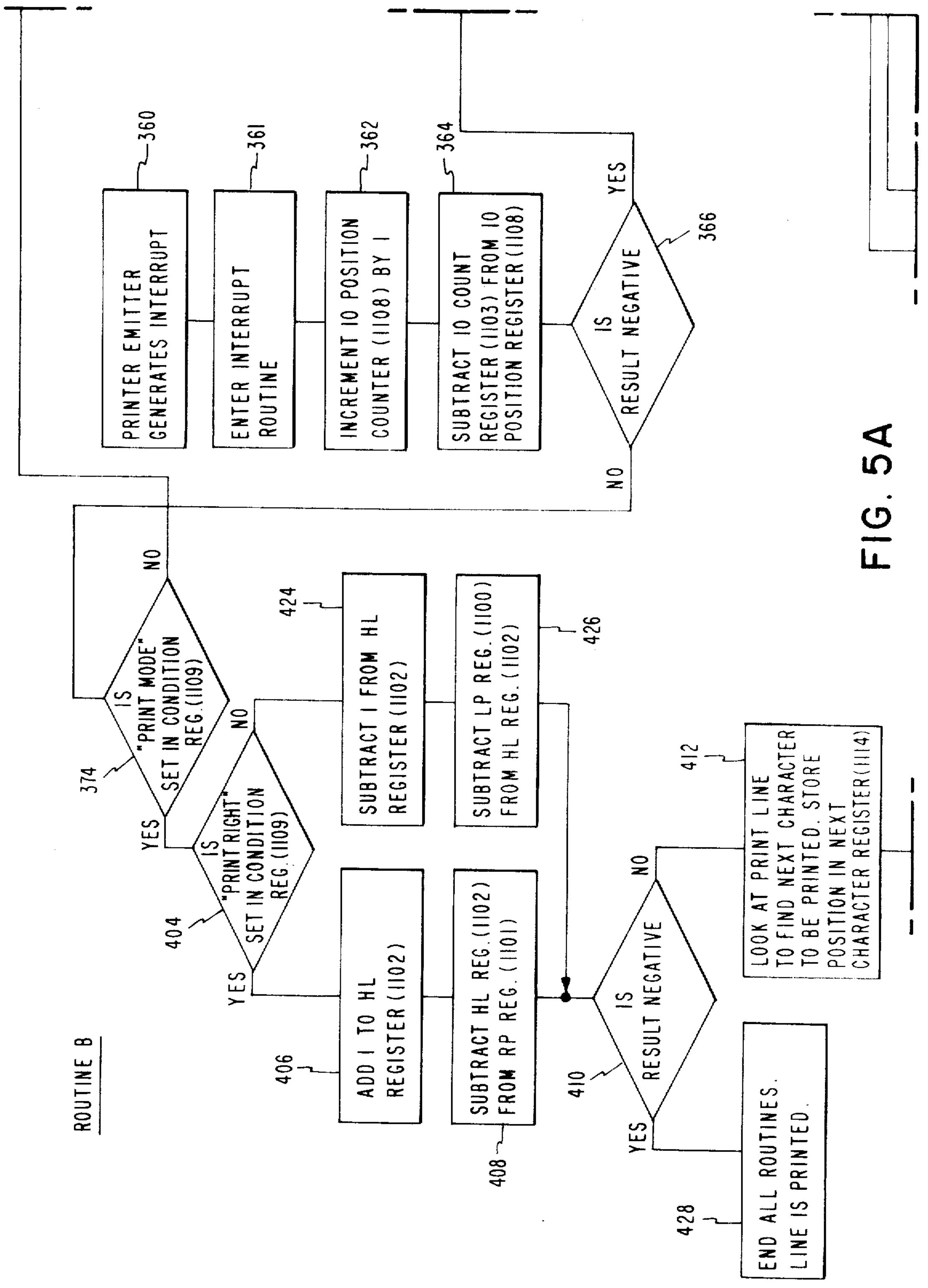
Figures 5, 5B:
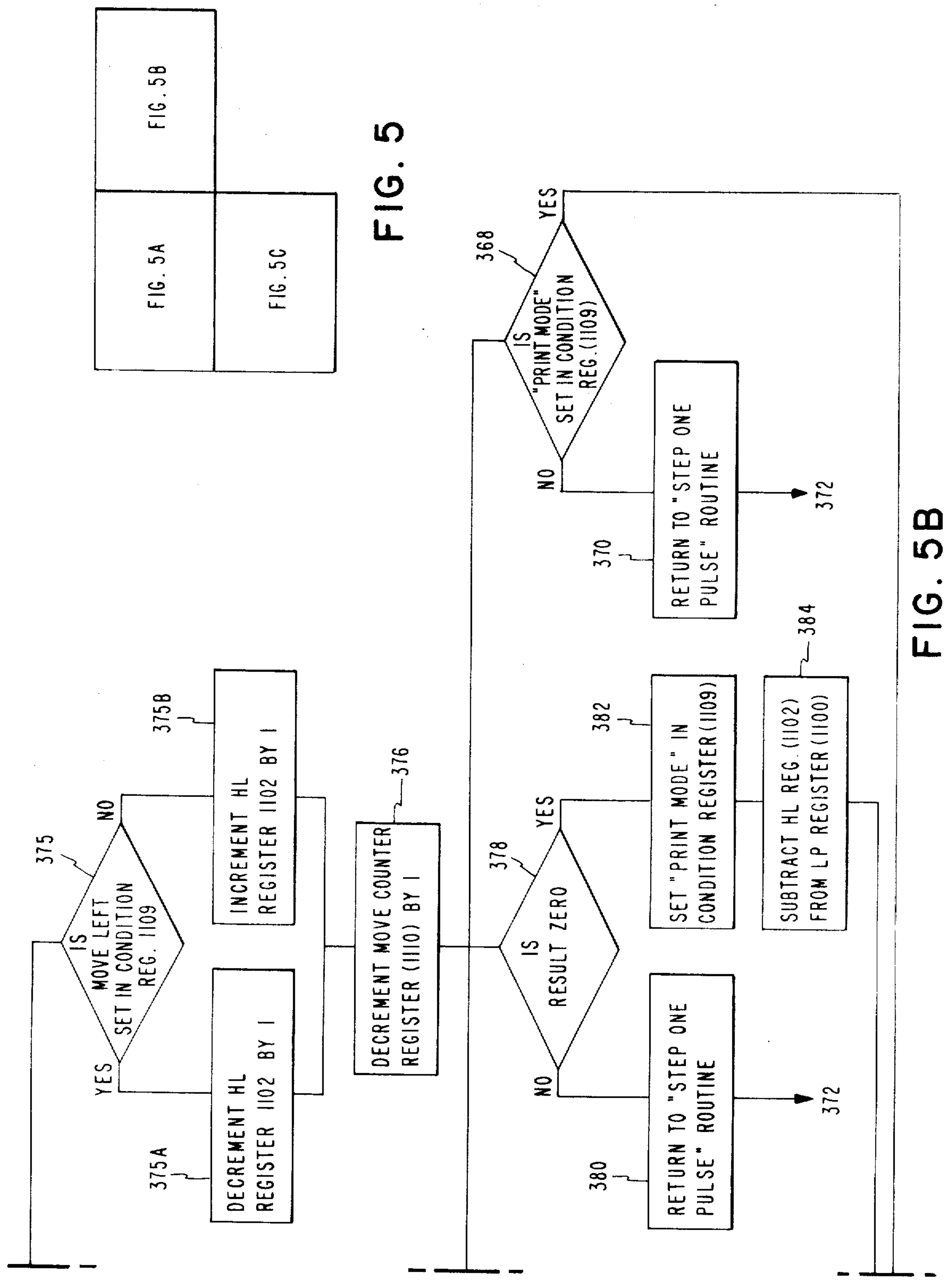
Figure 6A:
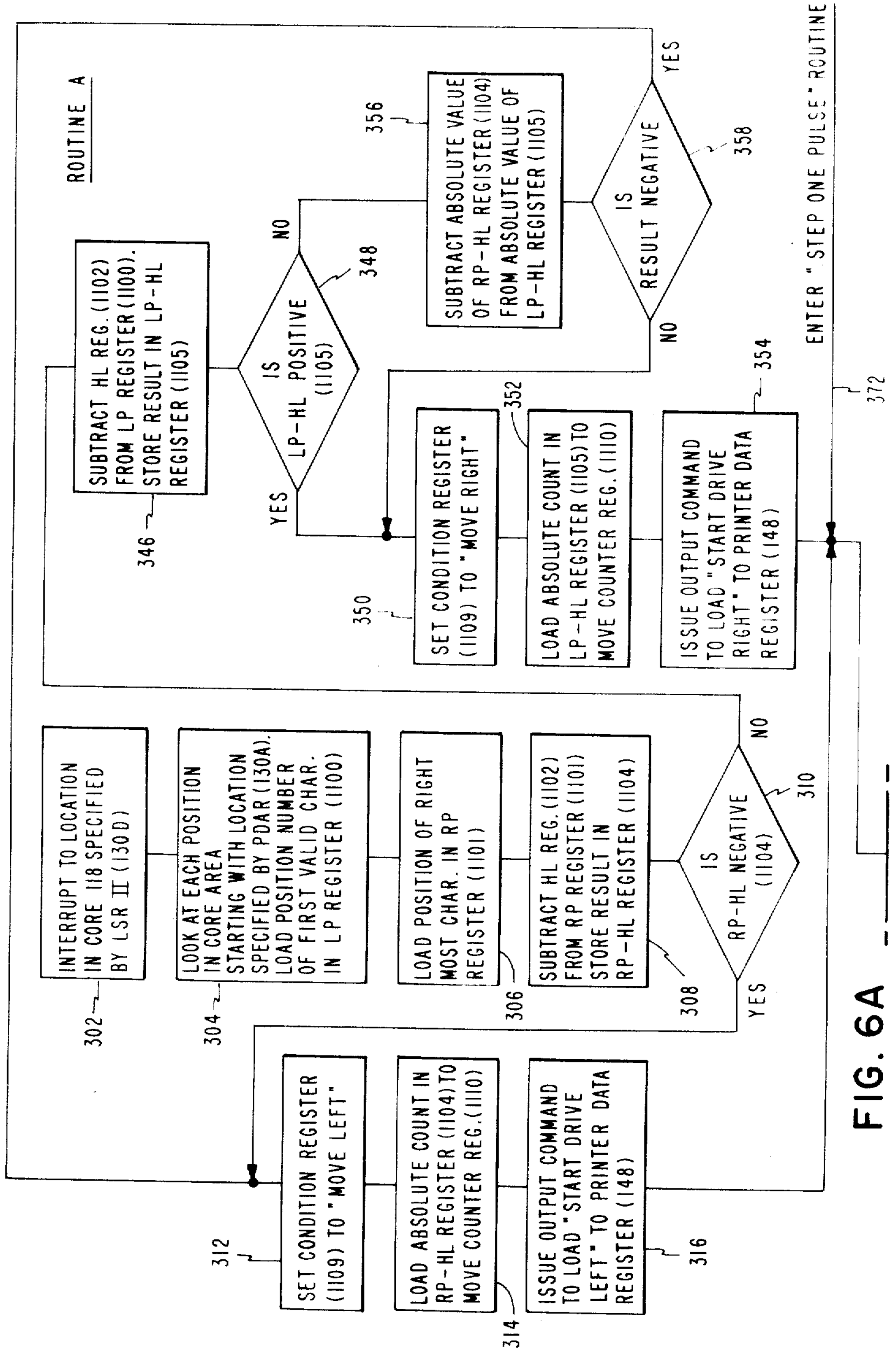
Figure 6B:
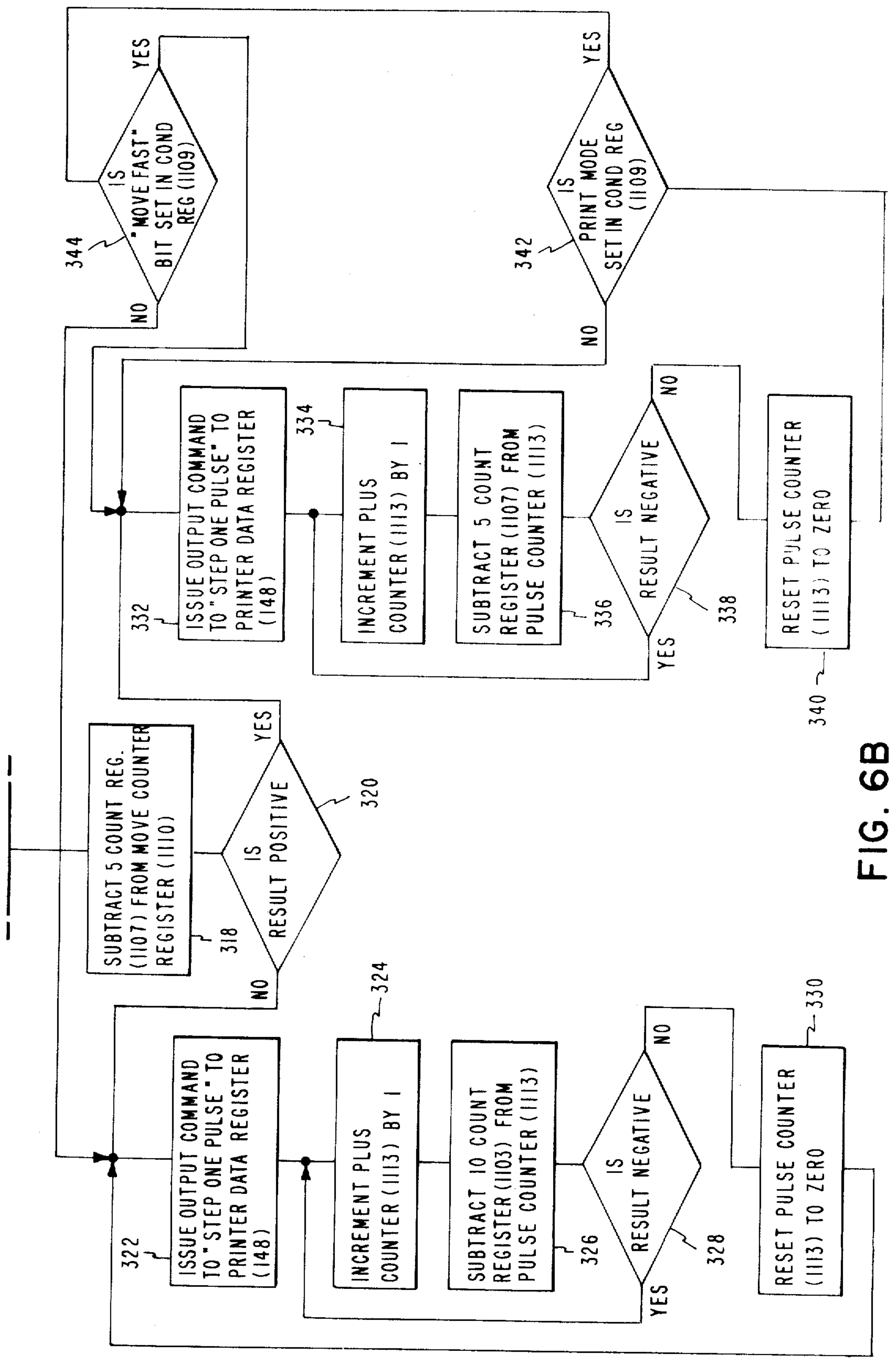

FIG.s 3A and 3B when placed together, with FIG. 3A on the left and FIG. 3B on the right, illustrate schematically a modification of the printer attachment shown in FIG. 2;

FIG.s 4A, 4B and 4C diagramatically show the makeup of various instructions used with the CPU;

FIG. 5 is a diagram showing the manner in which FIG.s 5A, 5B and 5C shall be placed together in order to show a part of a programmed sequence for use with the attachment shown in FIG. 2 for carrying out the objects of the invention, FIG.s 6A and 6B when placed together, with FIG. 6A on the top and FIG. 6B on the bottom, show the rest of the programmed sequence shown partly in FIG.s 5A, 5B and 5C.

Figure 8:
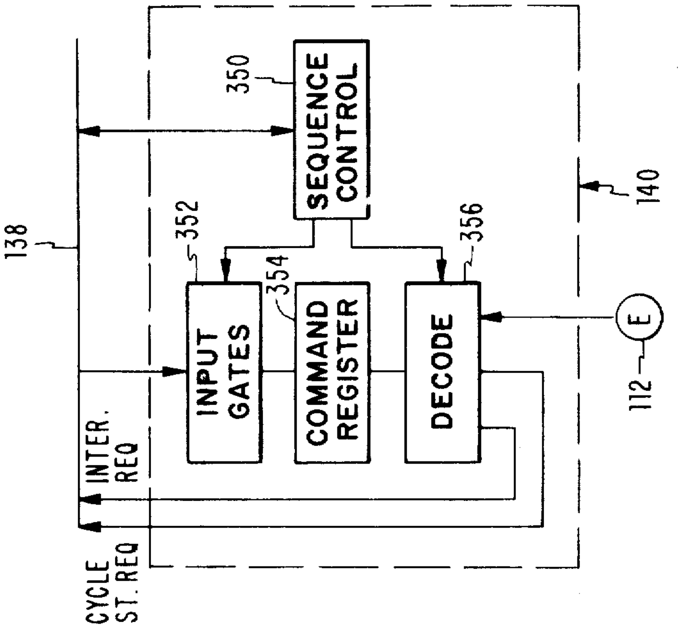
Figure 7:
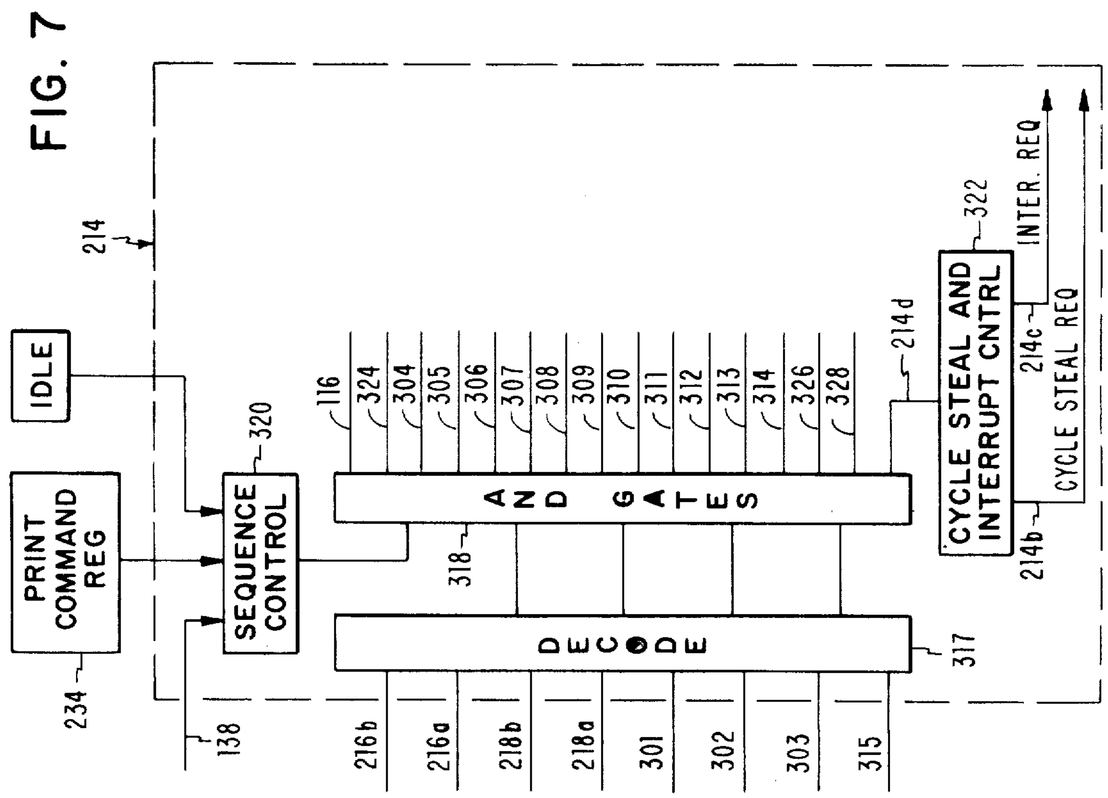

FIG. 7 is a schematic diagram showing the components contained in certain "Print Control Logic" shown in FIG. 3B; and FIG. 8 is a diagram showing the components in a "Printer Control Unit" shown in FIG. 2.

DETAILED DESCRIPTION

Figure 1:
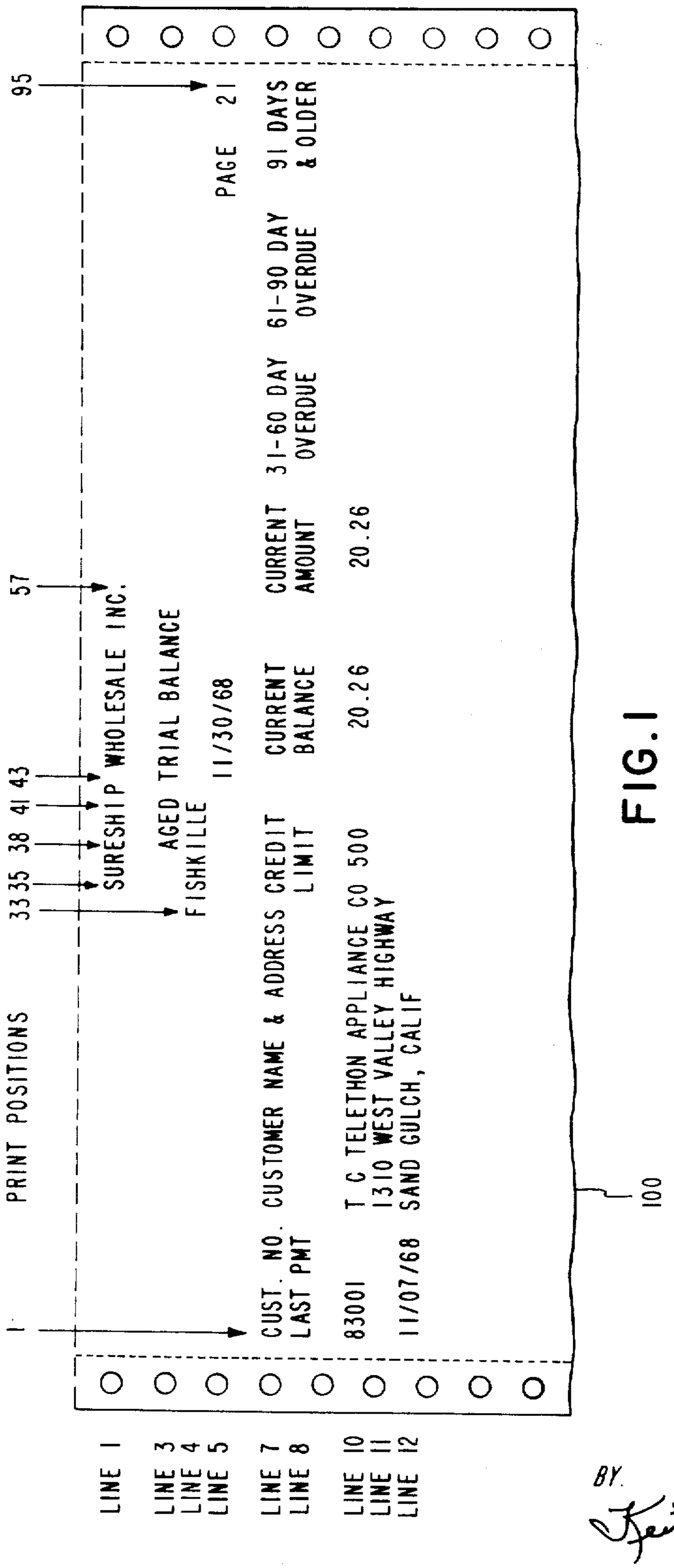
FIG. 1 is a view of a print form that may be printed using the serial printer controls of the invention.

The advantages and general operation of the printer controls of the invention can well be understood by referring to FIG. 1 which shows a typical output form 100 from a business accounting program that may be printed with the printing devices of the invention.

Assuming that the FIG. 1 form were printed by a prior conventional serial printer capable of printing in both directions at 85 characters/second, for example, the form could be generated at an effective rate of about 41 lines/minute. The print head would begin in the upper left-hand corner of the form and would generate line 1 in the forward direction, from left to right, ending up at the right side of the form (position 95). The form would then skip one line and line 3 would be printed from right to left, as the head moves from position 95 back to position 1. The subsequent lines would involve a start of movement of the print head from either position 1 or position 95, with the print head moving in opposite directions for consecutive lines of print.

The techniques and printer controls of the present invention provide for preanalysis of an upcoming print line to minimize head motion. Hence, for line 1, the print head needs to move only through position 57, which is the last character in line 1 to be printed. The controls then makes the decision to space the form on which the printing is being done and begins printing line 3 from the right to the left, beginning with position 55 and ending at position 38, these being the positions at which the end characters of the printed line occur. The form is spaced again, and the print head moves back again, toward the right, to position 41, and printing occurs again from right to left from position 41 to position 33 at which the first character of line 4 occurs. The decision was made to print line 4 from right to left, rather than from left to right, because the end character at position 41 of line 4 was closer to the last character printed at position 38 in line 3 than was the first character in line 4 at position 33. Printing of line 5 begins at position 43 and ends at position 95. Printing continues in this mode for the rest of the form, with the print head at the end of printing for each line being moved to either the beginning or the end of the printing for the following line depending on whether the beginning character or the ending character of the data to be printed in the following line is closer to the last position printed in the preceding line. The motion of the print head is thus optimized for minimum motion when the subsequent lines are printed, and it will be noted that two or more successive lines may all be printed in the same direction, i.e., left to right, or right to left. Employing this technique and printer controls has been found to increase effective throughput for a certain printer to an approximate 99 lines/minute for the form shown in lieu of the prior rate obtained of about 41 lines/minute.

The invention also provides for the acceleration of the print head when no characters are to be printed. It may be assumed, for example, that the speeding up or the slowing down of the print head may require about 2.5 character spaces each. Therefore, when over five spaces are left blank on a line, the print head can be moved at 170 characters/second rather than a normal print rate of 85 characters/second, for example. With respect to the form shown in FIG. 1, the high speed movement of the print head would occur, for example, between the characters "11/30/68" and the characters "page" in line 5. This increases still further the number of line per minute that may be printed, depending on the amount of blank spaces there are in the lines of print.

The essence of the invention is conceptual rather than being tied to specific implementations, and the inventive concept may be implemented by different ways as will be obvious to one skilled in the art, the scope of this invention being limited only by the appended claims. Two implementations are described herein, both of which assume a general purpose central processing unit (CPU) 102. One embodiment described herein utilizes an attachment 104 effectively disposed between the printer 106 and the CPU 100. The other embodiment described and shown particularly in FIG. 2 employs the CPU 102 as the decision-making element, with a minimum of logic contained in an attachment 108 which replaces the attachment 104. Both embodiments include the printer 106, which is assumed to be one of the wire matrix type.

The rpinter 106 includes a print head 110 which has a plurality of wires therein for printing the various dots on a paper sheet, such as the form 100. An emitter 112 is connected with the head 110 and provides emitter signals that reflect the position of the head 110. An appropriate two speed motor 114 drives the print head 110 either forwardly (from left to right) or reversely (right to left) across the sheet to be printed. Firing pulses are transmitted over a cable 116 to the print head 110 to actuate selected print wires in the head for printing the proper character onto the sheet to be printed. A typical wire matrix print head which might be adapted for use in this invention is shown in U.S.

Pat. No. 3,108,534 "High Speed Printer" by Preisinger, which is assigned to the same assignee as this application.

In both embodiments of the invention, the CPU 102 generates command signals which are interpreted by the attachments 104 and 108 to perform various functions, such as energizing the motor 114 for positioning of the wire matrix print head 110. The CPU 102 also supplies data signals identifying the characters to be printed, and corresponding information is transmitted through the cable 116 to the print head 110. Emitter signals from the emitter 112 reflect the position of the head 110 and are returned to the attachments 104 and 108 which use these signals in conjunction with the data signals previously mentioned to generate appropriately timed firing pulses over the cable 116 to actuate selected ones of the print wires.

A typical serial wire matrix printer operation would be effected to print the characters "eat," starting movement of the print head 110 from the left margin (print position 1) generating a command signal upon the occurrence of an emitter pulse E1, so that the seven dots are printed in the first column as shown. The head 110 continues to move toward the right and continues to respond to appropriate emitter pulses E2 – E27 in order for printing the other dots shown. Any of the other letters or numerals shown in FIG. 1 are printed in the same manner, and although the print head 110 has just been described as moving from left to right, starting with print position 1, the action of the print head 110 is the same when the head starts from any of the 95 print positions and travels in either direction. Upon completion of the printing of a line, the paper, such as the form 100, receiving the printed characters is usually indexed upwardly for one or more lines, this being under the control of the attachment 104 or the attachment 108, the then the attachment causes the head 110 to be again moved to a proper initial position for printing with respect to the following line of print.

CPUs of various constructions and arrangements of parts may be used for controlling the printer. The particular CPU 102 which is illustrated includes a core storage 118, a storage address register 120 which controls storage 118, a storage data register 122 for receiving data from storage 118, an A register 124 and a B register 126 receiving data from the register 122, an arithmetic logic unit (ALU) 128 receiving data from the registers 124 and 126 and providing data to the storage data register 122, local store registers 130 receiving data from the ALU 128 and supplying data to the storage address register 120, local store register select logic 132 for controlling the local store registers 130, and CPU controls and registers logic 134. The logic 134 is connected to provide data and control signals to the I/O channel 136 which in turn controls the LSR select logic 132.

In both embodiments to be described, the control by the CPU 102 of the printer 106 is accomplished by means of three basic instructions, namely, Start I/O (SIO), Load I/O (LIO), and Sense I/O (SNS).

Figure 4A:
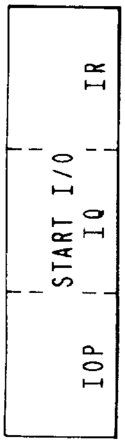

The Start I/O command is a three byte instruction as is indicated in FIG. 4A. Each byte consists of 8 bits. As used for controlling the printer 106, the instruction fields can be defined as follows: The IOP field indicates that a printer operation is to be performed (as contrasted with the operation of some other I/O device, not shown); the IQ byte identifies the specific address of the printer 106; and the IR byte contains special condition bits. Obviously, a single byte could perform the functions of these three bytes if only one I/O device, such as the printer 106, is attached; and a sufficient number of bit positions are available in the IOP byte to contain any necessary special condition bits.

Figure 4B:
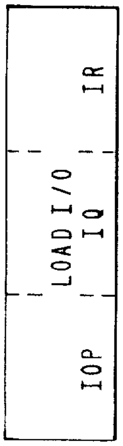

The Load I/O instruction indicated in FIG. 4B specifies (a) by means of the 8 bits in the IOP byte, that an I/O register (in the I/O channel 136) is to be loaded; (b) by means of the IQ byte, which register in which I/O device is to be loaded; and (c) by means of the IR byte, the storage location of the data to be loaded.

Figure 4C:
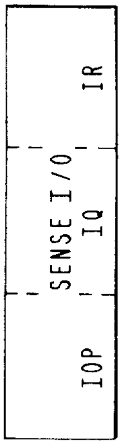

The Sense I/O instruction indicated in FIG. 4C specifies (a) by means of the IOP byte, that an I/O register in the channel 136 is to be interrogated; (b) by means of the IQ byte which register in which I/O device is to be interrogated; and (c) by means of the IR byte, the location in storage 118 where the value of the interrogated register is to be placed.

In connection with both embodiments of the invention, it is assumed that the printer attachment (the attachment 104 or the attachment 108) can communicate with the CPU 102 under either of two well-understood techniques: cycle stealing and interrupt. The local store registers 130 include the print data address register PDAR 130A, the print command address register PCAR 130B, and specific local store register I 130C and local store register II 130D. The registers PDAR 130A and PCAR 130B are dedicated to addressing core storage 118 on a cycle steal basis while LSR I 130C and LSR II 130D will contain starting addresses in core storage 118 of interrupt routines. Cycle steal operation, in conjunction with both embodiments of the present invention, is substantially the same as has been well known in the art in that the computer 102 is effectively under the control of the I/O attachment 102 or 104. The I/O channel 136 is connected by means of a cable 138 with the respective attachment 104 or 108, and the CPU 102 responds to signals on the cable 138 to perform the requested functions during a cycle steal. In particular, the attachment 104 or 108 must provide control signals via cable 138 as appropriate during a cycle steal to transfer the contents of either PCAR 130B or PDAR 130A to the storage address register 120 during the first part of a cycle steal if there is to be a data flow from core storage 118. The second portion of that cycle steal must be used to update the address in PCAR 130B or PDAR 130A as applicable, as well as the incrementing or decrementing and/or returning of bytes into storage 118.

Referring in particular to the embodiment of the invention shown in FIG. 2, the attachment 108 may be seen to comprise a printer control unit 140, drive logic 142 for controlling the motor 114, carriage control logic 144 for controlling the printer carriage 146, and a printer data register 148 all connected together as shown in FIG. 2 and cooperating together to control the movement of the wire matrix print head 110 under program control as will be hereinafter described. Referring to FIG. 8, the printer control unit 140 may be seen to comprise a sequence control 350 which communicates with the I/O channel 136 through the cable 138, input gates 352 which are enabled by the sequence control 350 and which receive data from the channel 136 through cable 138, a command register 354 storing the data which is gated by gates 352, and a decode 356 which is connected with the emitter 112 and which provides the interrupt request and cycle steal request signals to the cable 138 and I/O channel 136.

Referring to FIGS. 3A and 3B, the attachment 104 may be seen to comprise AND circuits 201 to 213, print control logic 214, the A comparator 216, the B comparator 218, the C comparator 220, the D comparator 222, the E comparator 224, the F comparator 226, left position (LP) register 228, right position (RP) register 230, head location register 232, print command register 234, ten count register 236, No. 1 counter 238, No. 2 counter 240, reverse latch 242, idle latch 244, fast latch 246, carriage control logic 248 for controlling carriage 146, oscillator 250, gate 252, divide by two logic 254 and motor drive logic 256 for controlling motor 14 and in turn controlled by gate 252 and logic 254. The E comparator 224 is connected with the print control logic 214 by a lead 301; the F comparator is connected with the print control logic by means of a lead 302; and the D comparator 222, the AND circuit 212, the AND circuit 202, the AND circuit 201, the AND circuit 205, the AND circuit 209, the AND circuit 208, the AND circuit 206, the AND circuit 204, the AND circuit 208, the AND circuit 211 and the AND circuit 210 are respectively connected with the print control logic 214 by means of leads 303, 304, 305, 306, 307, 308, 309, 310, 311, 312, 313 and 314. Reverse latch 242 has its output connected by lead 315 with the logic 214. And OR circuit 316 has the outputs of the AND circuits 211 and 212 applied to it as inputs and provides an output to the AND circuits 201 and 202.

Referring to FIG. 7, the print control logic 214 may be seen to comprise decode logic 317, AND gates 318, sequence control logic 320 and cycle steal and interrupt control logic 322. The lines 216a, 216b, 218a, 218b, 301, 302, 303 and 315 are connected as inputs to the decode logic 217, and a plurality of outputs of the decode logic 317 constitute respective inputs to the AND gates 318. The AND gates 318 are connected to the sequence control logic 320 which controls each of the AND circuits in the gates 318. The AND gates 318 are connected to the sequence control logic 320 which controls each of the AND circuits in the gates 318 for sequencing signals on the outputs of the AND gates 318. The outputs of the AND gates 318 are the lines 304 to 314, 116 and 214d to logic 322 and also lines 324, 326 and 328 respectively providing inputs to the print head 110, the fast latch 326 and the carriage control 248.

The carriage control logic 248 cooperating with the carriage 146 causes the carriage 146, undecontrol of the print control logic 214, to advance the form 100 on the carriage from one print line to the next print line. The attachment 104 serves primarily to interface with the I/O channel 136 and to decode the commands it receives from the channel 136. These commands are issued from the CPU 102 and are transmitted through the channel 136 and cable 138 to the print command register 234 in which the commands are stored.

The head location register 232 is driven from the 10 count register 236, and the ten count register 236 is in turn driven by the emitter 112. A count equivalent to the actual position of the head 110 in the number of characters from the left margin of the form, such as the form 100, is maintained in the head location register 232. The count in the register 232 is achieved by counting pulses from the emitter 112; and, for a movement of the head 110 from one print position to the next, the emitter 112 provides ten emitter pulses. These 10 pulses are counted by the 10 count register 236 which provides one signal to the head location register 232 through the AND circuits 201, 202, and 212 for each 10 emitter pulses. Therefore, as the head 110 moves one print position, the ten count register 236 generates a signal to change the contents of the head location register by one count. Both the 10 count register 236 and the head location register 232 are up/down counters, constructions of which are well known in the art. Whether the registers 232 and 236 count up or down is a function of the direction of movement of the head 110, and the motor direction is determined by the signal in the forward/reverse or "move right or left" output line **214*a* from the print control logic 214. The leftmost position of an upcoming line of print is stored in the LP register 228 and the rightmost position of a line of print is stored in the RP register 230. The registers 228 and 230** are loaded as will be hereinafter described.

The fast latch 246 constitutes the control for the motor 114 for determining whether a low speed or a high speed movement of the head 110 takes place. Movement of the head 110 is under the control of the oscillator 250 which provides pulses to the motor drive logic 256 that in turn drives the motor 114 for the head 110. When there is a signal on the low speed line **246*a* constituting the output of the fast latch 246, the gate 252 blocks the direct output of the oscillator 250 with respect to the motor drive logic 256. Under these conditions, the divide by two logic 254 provides a pulse to the motor drive logic 256 for each two pulses applied to the logic 254 for the purpose of driving the head 110 by means of the motor 114 at a low speed. The motor drive logic 256 may simply transmit the pulses from the logic 254 to the motor 114 which may be of a conventional stepper type. When there is no signal on the low speed line 246*a*, the gate 252 is opened; and, under these conditions all of the pulses from the oscillator 250 pass through the logic 256 to the motor 114 for the purpose of driving the head 110** at a high speed.

By appropriate programming sequences preceding a print operation, the print data address register (PDAR) 130A and the print command address register (PCAR) 130B are initialized by placing the address in core storage 118 of the first command into PCAR 130B and placing the address in core storage 118 of the first data field to be printed and associated with that command into PDAR 130A. A Start I/O instruction is included in the program to thereafter initiate operation of the printer. This Start I/O instruction specifies (a) by means of the IOP byte that an I/O operation is to be performed, (b) by means of the IQ byte that the printer is to perform the operation, and (c) by means of the IR byte any special control functions associated with that operation (see FIG. 4A). The print control logic 214 is initated at this time so as to invoke the first cycle steal.

The first cycle steal retrieves the print command from the location in core storage 118 which is specified by the contents of the print command address register PCAR 130B. This command is flushed through the CPU, particularly through the SDR 122 and the CPU controls and registers 134; and the command is transmitted through the I/O channel 136 and the cable 138 to the print command register 234. The command is sotred in the register 234 and is decoded by the print control logic 214. For exemplary purposes, it may be assumed that this command is to print one or more characters on the form 100.

At this time, the print control logic 214 requests an interrupt to the routine which is stored in LSR II 130D. The subroutine stored at this location has the effect of analyzing the upcoming line of characters to be printed and loads the starting (left end) position of the upcoming line of print in the LP register 228 and the ending (right end) position of the upcoming line of print in the RP register 230, this being accomplished by means of LIO instructions. The current location of the print head 110 is maintained in the head location register 232. Any suitable means may have been used at start up time to initialize the content of the head location register 232 to zero by driving the head 110 to a full left position and issuing a Load I/O instruction. Circuitry in the attachment 104, including the AND circuits 201, 202, 211, and 212, continuously monitors the location of the print head 110 and maintains the contents of the head location register 232 in synchronization with the actual position of the print head 110.

The operation of the attachment 104 can well be understood by means of the four examples which will now be given. In the first example, it will be assumed that the head 110 is located in the far left position, position 1 (corresponding to the E–1 position shown in FIG. 2). It will further be assumed that the left position register 228 has been loaded with the position or count "21" and the right position register has been loaded with the position or count "64."

These counts in registers 228 and 230 indicate that on a print form, such as the form 100, the left end of the upcoming line of print is at print position 21 and the right end of the upcoming line of print is at print position 64. With these values existing in registers 228, 230 and 232, both A comparator 216 and B comparator 218 provide negative signals on their output lines 216*a* and 218*a*. At this time, the head 110 is located farther left than either the position indicated by the left position register 228 or the right position register 230; and, under these conditions with a movement of the head 110 to the right being indicated, the negative signal on line 218*a* from B comparator 218 is meaningless. The negative signal on the line 216a from the A comparator 216 controls at this time and is effective on the print control logic 214 so that the logic 214 enables the circuits 211, 201, 203 and 205. The AND circuits 211, 201, 203 and 205 are enabled, in particular, by signals on lines 313, 306, 311 and 307 derived from the AND gates 318 at times determined by the sequence control 320. The AND gates 318 are in turn controlled by the outputs of the decode 317 to which the line 216*a* supplies an input. Clock pulses are applied to the lead 258 constituting inputs to the AND circuits 203 and 211, and these clock pulses are transmitted through AND circuits 211 and 201 to drive the head location register 232 in the up direction. The clock pulses are transmitted through the AND circuits 203 and 205 to likewise drive the No. 1 counter 238 in an up direction. These clock pulses continue to be so effective on the head location register 232 until the minus signal on line 216*a* drops, indicating that the contents of the head location register 232 equals the contents of the left position register 228. The number of clock pulses achieving this result is stored in the No. 1 counter 238. With the dropping of the negative signal on line 216*a*, the control logic 214 is then effective to enable AND gate 209 by means of a signal on line 308 provided by the decode 317 and AND gates 318 of the print control logic 214. AND gate 209 and the plus five comparator 220 are then effective to compare the count in the No. 1 counter 238 to the absolute number "five" applied to comparator 220 as a signal to indicate whether a high speed or a low speed advance is required on the motor 114. If the count in the No. 1 counter 238 exceeds five, the fast latch 246 is reset, causing the gate 252 to gate the oscillator 250 directly to the drive motor 114 through the motor drive logic 256 for moving the head 110 in a high speed mode.

In the next phase of the operation, AND gates 204 and 206 are enabled by the print control logic 214 by means of signals on lines 311, 310 and 312 derived from the decode 317 and AND gates 318 so that the output of the 10 count register 236 may decrement the No. 1 counter 238 as the head 110 actually moves from left to right. The E comparator 224 has the output of the No. 1 counter 238 applied to it and produces an output signal when the No. 1 counter 238 in content passes zero at which actual printing may proceed. At this time, the head location register 232 contains the count of 21 which is equal to the content of the left position register 228. The A comparator 216 as a result of the equal content of the registers 228 and 232 produces a plus signal on lead 216*b* effective on the print control logic 214. The logic 214, under this influence, cycle steals the first data character to be printed and begins to move the head 110 from the left-most print position to the rightmost print position in the line to be printed. AND gates 212 and 201 are effective for this purpose, having been enabled by signals on leads 304 and 306 derived from the AND gates 318 and decode 317, successively changing the content of head location register 232 whereby the A comparator 216 is effective to produce the proper signals on the logic 214. Printing occurs with motion of head 110 proceeding from left to right from the first position being printed. The fast latch 246 is held in reset condition by the print control logic 214 when printing is occurring so that the print head 110 moves at its slow speed. A cycle steal is requested for a new character each time there is an output from the 10 count register 236 effective on the AND gates 212 and 201. Head motion and printing continues from left to right until an output is achieved from the B comparator 218 indicating that the content of the head location register 232 matches the content of the right position register 230 and that printing of the line has been completed. This output from the B comparator 218 consists of the dropping of the minus output on line 218*a*. At this time, the print control logic 214 is effective on the carriage control logic 248 for causing the carriage 146 to be moved to another print line position. The output from the B comparator 218 on line 218*a*, indicating that a line of print has been finished causes the print control logic 214 to set the idle latch 244, and the condition of the latch 244 can be sensed by the CPU by means of the SIO instructions to ascertain that the line of print has been completed. After this and each following line of print is completed, the CPU 102 reloads the PDAR register 130A and the PCAR register 130B before issuing a new start I/O command to print the following line.

For cycle stealing for each of the characters to be printed, the print control logic 214 requests a cycle steal of the CPU 102 by raising the cycle steal request line 214*b;* and the next available cycle of the CPU will be assigned to the print control logic. The address from which data is to be cycle stolen is contained in the print data address register 130A. During the latter half of each CPU cycle, the address contained in the PDAR 130A will be incremented by one so that the next cycle steal request from the print control logic 214 will retrieve thenext contiguous data character to be printed by the head 110. The print control logic 214 functions to decode the character to be printed transmitted in EBCDIC code, for example, through the I/O channel 136 and produces a suitable bit pattern for the wires carried by the head 110 so as to cause the printing by the head 110 of the correct character onto the form 100.

For the second example, it will be assumed that the left position register 228 still contains the count of 21 and the right position register still contains the count of 64. However, in this case, the print head 110 is assumed to be at its extreme right hand position, at print position 72. This example will illustrate the manner in which the print head 110 goes from print position 72 in the leftward direction to print position 64 and starts to print in the left direction from print position 64.

The left position register 228 and the right position register 230 are loaded by means of an interrupt routine in the same manner as previously described. Because the location of the head 110 is to the right of both the left and right end positions of the line to be printed; and, in particular, because the content of the head location register 232 is greater than the contents of both the left position register 228 and the right position register 230, both A comparator 216 and B comparator 218 provide plus signals on their output leads 216*b* and 218*b*. In this case, the positive signal on the lead 216*b* from the A comparator 216 will be ignored; and the positive signal on the lead 218*b* from the B comparator 218 indicates, in this case, that the head 110 must move to the left. The print control logic 214 then acts on the motor drive logic 256 and motor 114 to start the print head 110 in the left direction. The distance that the head 110 should move left is ascertained by the action of the AND circuits 212, 202, 203 and 205 which are enabled by the print control logic 214 by signals on leads 304, 305, 311, 307 and 310 derived from the decode 317 through the AND gates 318. Clock pulses from line 258 are thus gated to drive the head location register 232 down in content and the No. 1 counter 238 up in content. The head location register 232 is driven down in content until the plus output from the B comparator 218 on lead 218*b* drops, indicating the number of steps necessary to move the head to the rightmost printing position. The plus five comparator 220 is gated as before to drive the motor 114 at either a fast or slow speed.

As printing begins at print position ,25 64, the control logic 214 enables AND circuits 204 and 206 by means of signals on leads 304 and 305 derived from decode 317 and AND gates 318 and starts the motor 114 in the left direction. Each output from the 10 count register 236 causes the No. 1 counter by means of AND circuits 204 and 206 to be driven downwardly one count. The output from the E comparator indicates that the head 110 is in its print position 64 when printing begins; and, at this time, the print control logic 214 resets the fast latch 246 and requests a cycle steal from the address contained in the print data address register 130A. Printing then proceeds in the left direction until an output from the A comparator 216 indicates that the content of head location register 232 matches the content of the left position register 228. The content of the head location register is driven downwardly with each output from the 10 count register 236 by virtue of the control logic 214 enabling AND circuits 212 and 202 by means of signals on leads 304 and 305 derived from decode 317 and AND gates 318. It should be noted that, as printing proceeds in the left direction, decoding of the characters to be printed is done in a reverse manner as compared to the manner decoding is accomplished when the print head 110 is moving from left to right. The logic 214 makes the decision to print from right to left and requests an interrupt to the routine, taken by means of the interrupt request line 214*c*, starting at the address held by local store register I 130C. This interrupt routine reverses the order of print characters starting at the address held by the print data address register 130A.

In the third example, it is assumed that the print head 110 lies between the leftmost and rightmost print positions of the line to be printed. In this case, it will be assumed, as before, that the LP register 228 and RP register 230 have been loaded with counts 21 and 64, respectively. In this example, it will be assumed that the head 110 is at print position 33 and the head location register so indicates. In this situation, the A comparator 216 has a positive signal on its lead 216*b* because the content of head location register 232 is greater than the content of LP register 228; and the B comparator 218 has a negative output on its lead 218*a* because the content of the head location register 232 is less than the content of the RP register 230. In this case, the correct direction of head motion is ascertained due to the action of the print control logic 214 enabling AND gates 201, 211, 203, 205 and 207 by means of signals on lines 313, 306, 311, 307, 309 and 310 derived from decode 317 and gates 318. Under these conditions, clock pulses 258 drive the contents of the head location register 232 upwardly and drive the contents of No. 1 counter 238 and No. 2 counter 240 upwardly until the output from the B comparator 218 indicates a match between the contents of the head location register 232 and the right position register 230. At this time, AND gates 203, 208, 211 and 202 are enabled by the print control logic 214 by means of signals on lines 311, 309, 312, 313 and 305 derived from decode 317 and AND gates 318. Clock pulses are then utilized to drive the contents of the head location register 232 downwardly and the contents of the No. 2 counter 240 downwardly also. An output from the D comparator 222 indicates when the No. 2 counter 240 has gone to zero, bearing in mind that the No. 2 counter originally held the number of print positions that the head 110 must move to the right to reach the rightmost printing position and the head location register 232 now contains its original content of 33. The No. 1 counter 238 now holds the number of print positions represented by the difference between the contents of the head location register 232 and the contents of the right position register 230. At this time, the print control logic 214 enables AND circuits 211, 202, 203 and 207 by means of signals on lines 313, 305, 311, 309 and 307 derived from decode 317 and AND gates 318, and clock pulses from line 258 drives the head location register 232 in content downwardly until an output from the A comparator 216 on the line 216a indicates that the content of the head location register 232 matches the content of the left position register 228. The number of clock pulses to achieve this down counting are stored in the No. 2 counter 240. At this time, the output on the F comparator on line 302 is sampled under the control of the print control logic to determine whether the content of the No. 1 counter 238 is greater than the content of the No. 2 counter 240. If the content of the No. 1 counter is equal to or less than the content of the No. 2 counter, the print control logic 214 causes the print head 110 to move to the right. If, as in this case, the content of the No. 1 counter is greater than the No. 2 counter content, the print head moves to the left.

The print control logic 214 under these conditions also enables AND gate 210 by means of a signal on line 314 derived from decode 317 and AND gates 318 so that the plus five comparator 220 may determine whether the fast latch 246 should be set to cause the head 110 to move at a faster speed. In this example, the print head 110 is nearer to the leftmost print position in the line to be printed than to the rightmost print position of the print line, being 12 positions from the left end of the line and 31 positions from the right end of the line. The print control logic 214 enables AND gates 212, 204 and 208 by means of signals on lines 304, 311, 309 and 312 derived from ecode 317 through AND gates 318, and motion of the head 110 is toward the left. Each output from the 10 count register 236 decrements the No. 2 counter 240, and an output from the D comparator indicates that the head 110 is moved to the print position 21 for printing.

In connection with the third example, it should be noted that a positive output from the A comparator 216 on lead 216b and a negative output from the B comparator 218 on the lead 218 caused the reverse latch 242 to be set by means of AND circuit 213. When the reverse latch 242 is set, this is an indication that the position of head 110 is somewhere between the leftmost and rightmost positions on the line to be printed. This latch 242 is sampled by the control logic 214 at the end of the head motion phase while the head 110 is traveling toward its initial printing position and before the actual cycle stealing is taken to begin printing. The setting of the reverse latch is effective on the print control logic 214 so that this logic will reverse the motor 114 at the end of the head motion phase, just before printing begins. This is necessary because the head motion phase may be from right to left, while the actual printing takes place from left to right.

In the fourth example, it will be assumed again that the contents of the left position register 228 is "21" and that of the right position register 230 is "64." In this case, it will be assumed that the location of the head 110 and the end of printing of the previous line is print position 50. In a manner as just described, the No. 1 counter 238 and the No. 2 counter 240 will be loaded with the differences between the actual head location (position 50) from the right print position stored in register 230 and the left print position stored in register 220, respectively. The No. 1 counter 238 thus holds a count of 14 and the No. 2 counter 240 holds a count of 29. Because the A comparator 216 has a positive output and the B comparator 218 has a negative output initially, the reverse latch 242 is set, as before. The output of the F comparator 226 indicates that the contents of the No. 1 counter 238 is less than the No. 2 counter 240. Therefore, the control logic 214 makes the decision to move the print head 110 initially to the right toward position 64. Because the number of print positions to be moved exceeds five, this motion is at a high speed. When the head 110 reaches print position 64, the control logic 214 samples the reverse latch, finds that this latch is set, and issues output instructions to the motor 114 to move the head from right to left. At this time, cycle stealing commences to bring in the characters from the CPU that are to be printed by the print head.

It should be noted that if the print head 110 is exactly in the middle between the leftmost position and the rightmost position of the line to be printed, (for example, twenty positions either way), the No. 1 counter 238 and the No. 2 counter 240 hold exactly the same counts. Therefore, the comparator will indicate that the contents of the No. 1 counter 238 does not exceed the contents of the No. 2 counter 240. In this situation, the attachment always causes the print head 110 to move to the rightmost position of the next line to be printed.

The attachment 108, as will be observed, has only a few components as compared to the attachment 104. The attachment 108 uses the CPU 102 for the various comparison operations, for storing, for counting, etc; and the CPU 102 is programmed in such a manner that the attachment 108 produces results and functions equivalent to those produced by the attachment 104 and, in addition, provides an alternate fast and slow speed drive for the print head 110 when the print head is traversing a line that is being printed, depending on whether five or more contiguous blank spaces exist in the line being printed.

In using the attachment 108, core storage 118 is used for storing the left and right end print positions of an upcoming line of print, as well as other data contained in the various components of the attachment 104. In particular, the following sections of core storage 118 have been set aside for use as the following registers and counters:

| Core Location | Definition of Register | Initial Condition |
|---|---|---|
| 100 | LP Register 1100 | 0 |
| 101 | RP Register 1101 | 0 |
| 102 | Head Location Register 1102 | 0 |
| 103 | Ten Count Register 1103 | 10 |
| 104 | RP -HL Count 1104 | 0 |
| 105 | LP-HL Count 1105 | 0 |
| 107 | Five Counter Register 1107 | 5 |
| 108 | Ten Position Counter 1108 | 0 |
| 109 | Condition Register 1109 | 0 |
| 110 | Move Counter 1110 | 0 |
| 113 | Pulse Counter 1113 | 0 |
| 114 | Next Character 1114 | 0 |

Figure 5C:
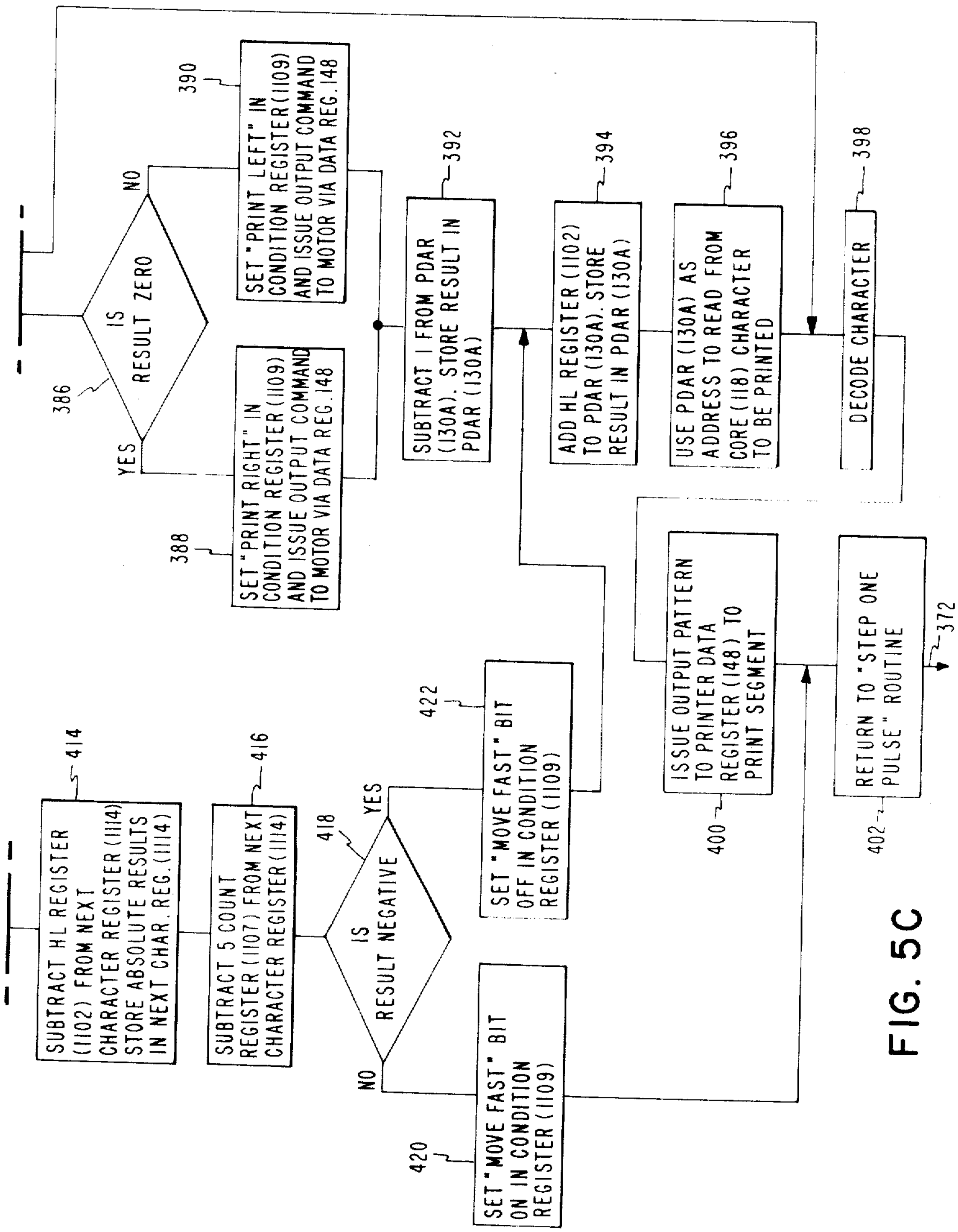

The operation of the attachment 108 is set forth in FIGS. 6A and 6B showing routine A and in FIGS. 5A, and 5C showing routine B. It is assumed that the print head 110 has completed the printing of a print line on the form 100 and is located in a certain print position at which the line of printing has been completed. This head location is registered in register 1102 and may or may not be at a margin. Unlike the head location register 232 in attachment 104 which changes at times in content with no actual change in head position, head location register 1102 always contains the true location of print head 110. The problem program at this time issues a start I/O instruction to start the succeeding print line, and the printer controls will, as in connection with the attachment 104, cycle steal the command word from the location in the core storage 118 specified by the print command address register 130B. The print line command is interpreted by the printer control logic 140, and the printer control logic 140 requests an interrupt to the line analysis routine which is specified by LSR II 130D. This is the first step 302 shown in routine A. The CPU 102 acting with the attachment 108 then must determine whether the print head 110 should move to the left or the right, depending on whether the left or right end position of the upcoming line of print is closer to the position of the print head 110 at which a line of printing has just been completed.

In accomplishing this result, the next step 304 occurs, and each position in the area of core containing the data of the upcoming print line is examined, starting with the location in core specified by PDAR 130A. The LP register 1100 in core storage 118 is then loaded with the position of the first or leftmost valid character of the upcoming line of print. During this examination of the line of print, the position of the rightmost character of the upcomming line of print is loaded in the RP register 1101 in core storage, as is shown in step 306.

The contents of the HL register 1102 is then subtracted from the contents of the RP register 1101, and the results are stored in the RP-HL register 1104, as is shown in step number 308. The contents of the RP-HL register 1104 are indicative of the position of the head 110 from the right most print position of the upcoming line of print.

In the next step 310 in routine A, the CPU 102 determines whether or not the contents of the RP-HL register 1104 are negative. If this register contains a negative value, this indicates that the present location of the head 100 is to the right of the right end position of the upcoming line of print; and, therefore, the head must travel to the left at this time.

Step 312 of routine A indicates that the condition register 1109 is set at this time to its "move left" condition. Accordingly to step 314, the absolute count in the RP-HL register 1104 is then loaded into the move counter register 1110. Step 316 then indicates at this time, as a result of the contents of the condition register 1109, that there is issued an output command to load "start drive left" into the printer data register 148 and thence to the motor drive circuitry 142.

The next step 318 in routine A indicates that the contents of the register 1107 containing a fixed five counts is subtracted from the contents of the move counter register 1110, which contains the absolute count of RP-HL. The step 318 determines, as will be set forth, whether the movement of the head 110 to the left is at a fast or slow speed, depending respectively on whether the head location is more or less than five print positions from the right end position of the upcoming line of print.

The routine step 320, in particular, indicates whether the distance to be traveled by the head 100 is greater or less than five print positions; and, if the number of print positions to be traveled is less than five, the next routine step is step 322. As indicated in step 322, an output command to "step one pulse" is issued to the printer data register 148, and thence to the motor drive circuitry 142. This output command of "step one pulse" causes the print head 110 to be moved to the left one step. At this time and with this movement of head 110, the pulse counter 1113 is incremented by one as shown in step 324. Pulse counter 1113 will be used as a 10 position counter ring effective before issuing the next step pulse to the printer motor. In the operation of the pulse counter 1113, the following occurs: 10 counts contained in register 1103 is subtracted from the contents of pulse counter 1113 as indicated in step 326. If the result in pulse counter 1113 is negative, step 328 indicates that step 324 is again repeated. This continues until the contents of pulse counter 1113 has reached the count of 10. At this time, step 330 will reset pulse counter 1113 to zero and continue back to step 322 which issues another step one pulse to the printer data register 148 and thence to the motor drive circuitry 142. Steps 322 through 330 will continue to issue output pulses to the drive motor 114 at a relatively slow speed until routine B, which measures the actua linear motion of the head 110, is effective.

If the print head is more than five print positions away from the right end position of the upcoming line of print, the result in step 320 is positive; and steps 332, 334, 336, 338 and 340 then occur in the same manner as steps 322, 324, 326, 328 and 330 previously described. Step 336 may be contrasted with step 326 in this connection and causes the subtraction of the five count register 1107 rather than the contents of the ten count register 1103, and this has the effect of causing the motor 114 to be in its high speed mode, driving the head 110 in high speed instead of low speed. The motor 114 is driven in high speed in this case instead of low speed because the timing ring consisting of steps 334 through 338 has only counted five positioned in pulse counter 1113 between drive pulses to the motor 114 whereas, in the low speed mode as described in steps 324 through 328, 10 positions were counted between drive pulses to the motor 114, the time constants of both rings are the same. Routine step 342 follows step 340; however, for the conditions just assumed, prior to printing by head 110, the "print mode" is not set in condition register 1109, and steps 332 to 340 occur as just mentioned. When printing actually does occur as will be subsequently described, "print mode" is set in the condition register 1109; and, in this case, routine step 324 is effective as will be described. It may be noted at this point that actual linear motion of the head 110 is detected by the emitter 112 and is noted by the CPU under interrupt routine B. There may be a multiplicity of step pulses to the motor drive circuitry 142 for every pulse from emitter 112, and these step pulses are indicated as E1, E2, etc. on FIG. 2.

In the event that RP-HL is positive, that is, if the present location of the head 110 is to the left of the right end position of the upcoming line of print, routine step 310 causes step 346 to be then effective. In step 346, the contents of the HL register is subtracted from the contents of the LP register, and LP-HL is stored in register 1105. Whether or not LP-HL is positive is determined in step 348; and, if the head 110 is located to the left of the left end position of the upcoming line of print, LP-HL is positive and step 350 then occurs. In this step, the condition register 1109 is set to "move right"; and, subsequently, in the next step 352, the absolute count in the LP-HL register is loaded into the move counter register 1110. The next step 354 causes the head 110 to actually move to the right, and the speed of head movement is determined by step 318 and the following steps just described.

In the event that LP-HL is negative indicating that head 110 is located to the right of LP, step 356 follows step 348. In step 356, the absolute value of RP-HL is subtracted from the absolute value of LP-HL for determining whether the head should move to the right or to the left for traveling to the closer one of the end positions of the upcoming line of print. If the absolute value of RP-HL is greater than the absolute value of LP-HL, the succeeding step 358 causes step 312 to then be effective for a move to the left of the head 110 as previously described. On the other hand, if the absolute value of LP-HL is greater than the absolute value of RP-HL, the result of the subtraction is positive and a move to the right is indicated. Step 350 and the following steps previously referred to are then operative for moving the head 110 to the right.

Referring to routine B shown in FIG.s 5A, 5B, and 5C, every step made by the printer head 110 generates an emitter pulse from emitter 112. There are ten such emitter pulses for each print position that the head 110 traverses, and the CPU 102 is so programmed as to cause the print wires of the head 110 to be active to print, generally, for alternate ones of the emitter pulses. This is apparent from FIG. 2 which shows that the wires of the head 110 have printed for emitter pulses 1, 3, 5, and 7 in order to form the letter E.

As the head 110 moves one step, the emitter 112 generates an emitter pulse as is indicated in step 360 in routine B (See FIG.s 5A, 5B, and 5C). Step 361 indicates the ordinary routine of the CPU is interrupted to execute routines in connection with the matrix printer for each movement of the printer head 110 a specified distance as indicated by the emitter pulse being generated. Step 362 indicates that this pulse is used to increment the 10 position counter 1108 by one count. Assuming that the head 110 is starting to move from the last position at which printing occurred in the preceding line to either the LP or RP positions in the upcoming line to be printed, at this time the ten position counter 1108 contains a count of one. Step 364 indicates that the fixed count of ten in register 1103 is subtracted from the contents of the ten position counter 1108, and the result of the subtraction at this time is −9.

Step 366 indicates that under these conditions step 368 is next; and, since "print mode" is not set in condition register 1109, step 370 now occurs. The path 372 from step 370 indicates that the "step one pulse" routine entering routine A just previous to step 318 is effective; and, as has been previously described, this "step one pulse" routine functions to continue the head movement. This "step one pulse" routine is repeated until step 366 indicates that the 10 position register 1108 now contains 10 as a count; and, therefore at this time step 374 is effective. When register 1108 contains a 10 as a count, this indicates that the head 110 has moved a full character position (ten emitter pulses).

It is assumed that the head 110 at this time is moving toward either the LP or RP position from the last position of the preceding line that has been printed, and therefore "print mode" is not set in condition register 1109 at this time. Steps 375, 375A and 375B serve to keep the head location register 1102 in synchronization with the actual position of the print head 110 by decrementing the head location register 1102 by one if motion is to go left and by incrementing the head location register by one if motion is to the right. Step 376 is then effective; and the move counter register 1110, which carries the number of positions that the head 110 is to be moved, is decremented by one according to step 376. If the head 110 still has movement to be made to reach either the LP or RP position, the move counter register 1110 still contains a count; and, accordingly to step 378, the succeeding step will be step 380 indicating that the particular routine has ended and that the head 110 keeps moving by virtue of the return to the step one pulse routine by path 372. When the contents of the move counter register 1110 is zero as a result of continued movement of the head 110; as is indicated by step 382, "print mode" is set in condition register 1109. The print head 110 is now in its LP or RP position, ready for printing.

Step 384 indicates that, at this time, the absolute contents of the RP-HL register 1104 is subtracted from the absolute contents of the LP-HL register 1105; and step 386 indicates that if this difference is zero, the head 110 is at the leftmost print position of the upcoming line to be printed. If the difference is zero, in this case step 388 is effective for setting "print right" in the condition register 1109. On the other hand, if the difference is not zero, it is assumed head 110 is at the rightmost position of the upcoming line to be printed, and step 390 sets "print left" in the condition register 1109.

Step 392 indicates that, at this time, "one" is subtracted from the print data address register 130A, and the result is stored in this same register. Step 394 indicates that the contents of the head location register 1102 is added to the contents of the PDAR 130A, and the results are stored in the PDAR 130A. The contents of the PDAR 130A is used as the address to read from core storage 118 the character to be first printed at either the LP or RP positions of the new print line. This is indicated in step 396.

The character read from core storage 118 as indicated by step 396 is decoded as is indicated in step 398; and, according to step 400, the output pattern of the print wires to be utilized in the particular position of these wires is issued to the printer data register 148 so as to cause the first "slice" or segment of the character to be printed. If printing is proceeding from left to right, the first slice of the decode will be the leftmost slice of the character. If on the other hand, printing is proceeding from right to left, the first slice of the decode will be rightmost slice of the character. As indicated in the next step 402, a return is made to the "step one pulse" routine by means of path 372. The "step one pulse" routine causes the head 110 to continue stepping additional steps, and the resulting emitter pulses act as indicated by steps 360, 362, 364 and 366. After the first slice of the first character has been printed as above described, the result of the subtraction indicated in step 366 is negative so that step 368 is next effective. "Print mode" is set in the condition register 1109, and therefore, steps 398, 400 and 402 are effective with respect to the next slice for the character. This operation continues until all of the first character on the first line of print has been printed consisting of 10 character slices corresponding to 10 pulses from emitter 112.

At this time, the result of the subtraction of the contents of the 10 count register 1103 from the ten position counter 1108 becomes zero; and step 374 is then effective, since "print mode" is set in condition register 1109, to render step 404 effective.

Either "print right" or "print left" is in condition register 1109 in accordance with step 388 or step 390 as above described; and, if "print right" is set, according to step 406, a count of one is added to the contents of the HL register 1102. According to step 408, the contents of the HL register 1102 is then subtracted from the RP register 1101; and, assuming that the print line has not been completed, step 410 renders step 412 next effective. According to step 412, the print line being printed is examined in core storage 118 to locate the next character to be printed, and the position of the next character is stored in the next character register 1114. As noted in step 414, the next operation is to subtract the contents of the HL register from the next character register 1114; and the absolute results are stored in the next character register 1114. A fixed count of five contained in the five count register 1107 is next subtracted from the contents of the next character register 1114, as set forth in step 416; and, assuming that the next character to be printed is located more than five print positions away from the position of head 110, step 418 is effective to render step 420 effective. According to step 420, the "move fast" bit in condition register 1109 is set, and this results in the "step one pulse" routine being effective with the drive head 110 moving at a fast speed, with steps 342 and 344 in Routine A in particular causing the high speed head movement. As is apparent, this fast speed movement of the head 110 occurs when the line being printed contains more than five contiguous spaces having no printed characters.

The result of the subtraction of the five counts, when there are less than five adjacent spaces in a line being printed, is to cause step 422 to be effective. In step 422 the "move fast" bit is turned off in the condition register 1109, and the result is that the head 110 moves at a slow speed by virtue of the action of step 344 in routine A. Printing continues with consecutive slices of the characters in the print line being printed by the wires of the printer, utilizing steps 394, 396, 398, 400 and 402. Steps 394, 396, etc. follow step 422 as the result of the subtraction in step 416 indicating that there are less than five positions that are to be moved before the next character is to be printed and in fact the very next character may need to be printed. Therefore, the character decode routines as in step 398 must be entered. If in fact certain of these characters are balnk, the decode in step 398 will not in fact drive the print wires.

Additional slices, subsequent to the first slice, of a first and each subsequent character are printed as a result of steps 366 and 368. The result is negative in step 366 for all of the subsequent nine slices of each character after the first; and, step 368 results in a decode being made by step 398, without the PDAR 130A being operated on by steps 392, 394 and 396. After the full character has been printed, step 366 results in steps 374 and 404 being effective for reading another character from core storage 118 and causing printing of that character in the same manner as has occurred for the first character printed as just described. In this connection, it should be noted that step 374 will route the first character to be printed in a line through steps 375, 376, etc. Subsequent characters in a line will be routed by step 374 through steps 404, etc.

In the event that a rightward movement of the print head 110 is in order, steps 424 and 426 are effective in lieu of steps 406 and 308. The operation is the same as previously described except that the head 110 moves to the left. The subtractions effective on step 410 yield a negative result when the print line has been completed, and step 428 is then effective to end all routines.

The invention herein is related to that disclosed in U.S. Pat. No. 3,708,050 issued Jan. 2, 1973 to J.H. McCarthy. The central processing unit 102 referred to herein may be of any suitable conventional type and may for example be that disclosed in U.S. Pat. No. 3,701,105 issued Oct. 24, 1972. This patent discloses the IBM System/3 central processing unit which is also described in IBM document SY31-0207-2 that may be referred to for details of a suitable central processing unit. The ALU 128 may, for example, be that described in U.S. Pat. No. 3,596,074 issued July 27, 1971, which is referred to in U.S. Pat. No. 3,701,105. The I/O channel 136 may be of any conventional type and may, for example, be that described in U.S. Pat. No. 3,680,054, issued July 25, 1972, which refers to the IBM System/3 computer. Carriage controls as indicated by logic 144 and 248 are not particularly relevant to the claimed invention; however, for reference purposes, the function and construction of such carriage control logic may be as described in U.S. Pat. No. 2,983,356 issued May 9. 1961 or IBM TECHNICAL DISCLOSURE BULLETIN, page 657, Vol. 13, No. 3 of Aug, 1970. The printer control logic 140 and 214, more specifically than above described, may contain registers for the selection of LSR's (local store registers 130 including print command and print charater registers), an address decoder for use with the channel 136 and logic to establish direction of movement of the head 110. The implementation of these functions is not unique, and a detailed description is not necessary for an understanding of the claimed invention. The idle latch 244 is a simple direct current latch which is set at the end of the printing of each line of print. The motor drives 142 and 256 are stepping motor drives and are conventional, such as of the type described in U.S. Pat. No. 3,328,658 issued June 27, 1967. It will be understood that simply by changing the sequences of pulses to such a drive, the motor for driving the head 110 can be made to drive in either a forward or reverse direction.

What is claimed is:

1. Apparatus for controlling a serial printer cpaable of bidirectional printing using relative motion between the medium upon which printing is to be effected and a printing element, comprising:

means for causing relative motion between said medium and said printing element so that printing ebds at an end print position in a first line of print, means for analyzing the succeeding line of print to determine which end of the succeeding line of print is closer to said end print position of said first line of print, means for causing relative movement between said printing element and said printing medium to align said printing element with the end position of said succeeding line of print on said printing medium which is closer to said end position of said first line of print, and means for then printing said succeeding line of print with relative motion between said printing medium and printing element starting at the print position in said succeeding line which is closer to said end position of said first line of print.

2. Apparatus for controlling a serial printer capable of bidirecitonal printing using a printing element which is moveable with respect to a form on which printing is to be effected, comprising:

means for moving said printing element so that printing on said form ends at an end print position in a first line of print, means for analyzing the succeeding line of print to determine which end of the succeeding line of print is closer to said end print position of said first line of print, means for moving said printing element to the end position of said succeeding line of print which is closer to said end position of said first line of print, and means for then printing said succeeding line of print starting at the print position in said succeeding line of print to which said printing element has been so moved.

3. Apparatus for controlling a serial printer as set forth in claim 2, said analyzing means including comparison means for determining the difference between said end position in said first line of print and one of the end positions in the succeeding line of print and including also a second comparison means for determining the difference between said end position in said first line of print and the other of said end positions of the succeeding line of print.

4. Apparatus for controlling a serial printer as set forth in claim 3, said analyzing means and said comparison means being contained in general purpose computer which is programmed so as to carry out the analyzing and comparison functions as aforesaid.

5. Apparatus for controlling a serial printer as set forth in claim 2, said analyzing means including a head location register for recording the position of said printing element, a left position register for recording one of the end print positions of said succeeding print line, a right position register for recording the other end position of said succeeding print line, comparison means for determining the difference in the contents of said head location register and said left position register, and comparison means for determining the differences in contents between said head location register and said right position register.

6. Apparatus for controlling a serial printer as set forth in claim 2, said analyzing means including a head location register for recording the position of said printing element, a left position register for recording one of the end print positions of said succeeding print line, a right position register for recording the other end position of said succeeding print line, counting means for registering the difference in content between the head location register and said left position register, counting means for registering the difference in content between the head location register and said right position register, and means for comparing the contents of said two counting means, said means for moving said printing element being under the control of said comparing means to determine in which direction said printing element is to be moved.

7. Apparatus for controlling serial printer as set forth in claim 5, and analyzing means including said comparison means being contained in a general purpose computer which is programmed so as to carry out the analyzing and comparison functions as aforesaid and which has a store for storing information, said right and left position registers being contained in said store.

8. Apparatus for controlling a serial printer as set forth in claim 2, and including means for driving said printing element across said form at a low speed and a high speed, means for determining whether the number of print positions said printing element is to be moved toward said closer end of said succeeding line of print is greater than a predetermined number of print positions, and means controlling said slow and fast speed drive means so that said printing element is moved at a high speed if the number of print positions the printing element moves to said closer end position is greater than said predetermined number of print positions.

9. Apparatus for controlling a serial printer as set forth in claim 8, said determining means including counting means for indicating the number of print positions said printing element must traverse in order to move from said end print position in said first line of print to the end of said succeeding line of print at which printing begins and comparison means for determining whether the contents of said counting means is greater than said predetermined number of print positions.

10. Apparatus for controlling a serial printer as set forth in claim 9, said counting means and said comparison means being contained in a general purpose computer which is programmed so as to carry out the counting and comparison functions as aforesaid.

11. Apparatus for controlling a serial printer which prints using relative motion between the medium upon which printing is to be effected and a printing element, comprising:

means for causing relative motion between said medium and said printing element as the printing element is effective to print a print line, means for analyzing the line being printed to determine if it contains more than a predetermined number of contiguous spaces or print positions into which no characters are to be printed, means for driving said medium and printing element with respect to each other either at a relatively fast or slow speed, and means under the control of said analyzing means so as to cause said driving means to drive said printing medium and printing element relative to each other at a fast speed if the number of spaces exceeds said predetermined number and at a slow speed if the number of spaces does not exceed said predetermined number.

12. Apparatus for controlling a serial printer as set forth in claim 11, said analyzing means being contained in a general purpose computer which is programmed so as to cause said means under the control of said analyzing means to function as aforesaid.

13. A method of controlling a serial printer comprising the steps of:

completing a line of print with relative movement between the medium upon which printing is done and a printing element so that the printing element is last effective at the end of the print line, determining the difference in print positions between said print line end and the two end positions of a succeeding line of print, moving said printing medium and print head relative to each other so that the print head is positioned at the closer one of the end positions of said succeeding line of print, and causing said printing element to print said succeeding line of print beginning at said closer one of said end positions of said succeeding line of print.

14. A method of controlling a serial printer comprising the steps of:

completing a line of print with a printing element moving in one direction to an end of the line of print, determining the difference in print positions between said end position of said first line of print and the two end positions of succeeding line of print, moving said printing element from said end position of said first line of print to the closer one of the end positions of said succeeding line of print, and causing said printing element to print said succeeding line of print beginning at said closer one of said end positions of said succeeding line of print.

15. A method of controlling a serial printer as set forth in claim 14, said difference being determined by recording the present printing position of said printing element, recording the two end positions of said succeeding line of print, and determining the difference in the recorded counts of the present position of the printing element and the two end printing positions at the ends of said succeeding line of print.

16. A method of controlling a serial printer as set forth in claim 14, and including:

comparing the difference in print positions between said end position of said first line of print and the closer one of said two end positions of the succeeding line of print to a predetermined count, and moving said printing element from said end position of said first line of print to the closer end position of said succeeding line of print at a relatively fast speed if this difference is greater than said predetermined count and at a relatively slow speed if this difference is not greater than said predetermined count.

17. A method of controlling a serial printer which includes a printing medium upon which printing is to be effected and a print element movable with respect to each other so that the print element is effective to print in lines on the printing medium, comprising:

analyzing an upcoming line of print to determine whether or not it contains more than a predetermined number of contiguous spaces or print positions into which no characters are to be printed, causing said printing element to print said line of print, and driving said printing medium and print element at fast or slow speeds with respect to each other as spaces in said print line are being traversed by said printing element when the printing element is printing said line, said fast or slow speeds respectively being so effective when there are a predetermined number or more of said spaces or less than said predetermined number of spaces in the print line being printed by said print element.

18. A method of controlling a serial printer as set forth in claim 17, said printing medium constituting a print form and said printing element being movable with respect to said form for printing, said analyzing being accomplished by utilizing a general purpose computer which is programmed to analyze the upcoming line of print as aforesaid.

* * * * *